Sept. 30, 1947.  G. B. LOPER  2,428,168
SEISMIC WAVE DETECTOR
Filed June 30, 1944  2 Sheets—Sheet 1

INVENTOR.
GEORGE B. LOPER
BY Sidney A. Johnson
Attorney

Sept. 30, 1947.  G. B. LOPER  2,428,168
SEISMIC WAVE DETECTOR
Filed June 30, 1944  2 Sheets-Sheet 2

INVENTOR.
GEORGE B. LOPER.
BY
Sidney A. Johnson
Attorney.

Patented Sept. 30, 1947

2,428,168

UNITED STATES PATENT OFFICE 2,428,168

SEISMIC WAVE DETECTOR

George B. Loper, Dallas, Tex., assignor, by mesne assignments, to Socony-Vacuum Oil Company, Incorporated, New York, N. Y., a corporation of New York Application June 30, 1944, Serial No. 543,036

11 Claims. (Cl. 177—352)

1

This invention relates to seismic wave detectors of the type ordinarily used to detect seismic waves, and has for an object the provision of a supporting device for locating and holding a detector at any desired depth within a drill hole.

In general, seismic detectors must make intimate or good contact with the earth through which the seismic waves travel in order to detect them. At the surface, loose dirt may be removed and each geophone located on the more compact subsoil. Located in this manner, the geophones serve to detect the seismic waves and their reflections. In order to detect the seismic waves at various depths in the earth's surface it has been proposed to locate seismic detectors, or geophones, at different depths in a drill hole. To insure satisfactory operation of the geophone in such a drill hole it is necessary to clamp the geophone firmly against a wall of the drill hole so that the seismic wave-detecting elements will be sensitive to, or affected by, the seismic waves.

In carrying out the present invention in one form thereof, each seismic wave detector is provided with surface-operated clamping means for clamping or insuring the firm engagement of the detector with the wall of a drill hole. In the preferred form of the invention, the clamping means not only provides arms which press against one wall of the drill hole to press the geophone firmly against the opposite wall or side of the drill hole, but these arms also serve to suspend the geophone in a fixed position. In this manner, a plurality of geophones may be mounted at different positions within the drill hole. Further, in accordance with the invention, the clamping mechanism may be operated from the surface or above the drill hole. Each geophone may be moved up or down the drill hole and re-secured in any desired new position.

For a more detailed explanation of the invention, and for further advantages and objects thereof, reference is to be had to the following detailed description, taken in conjunction with the accompanying drawing, in which.

2

Figures 6, 7:
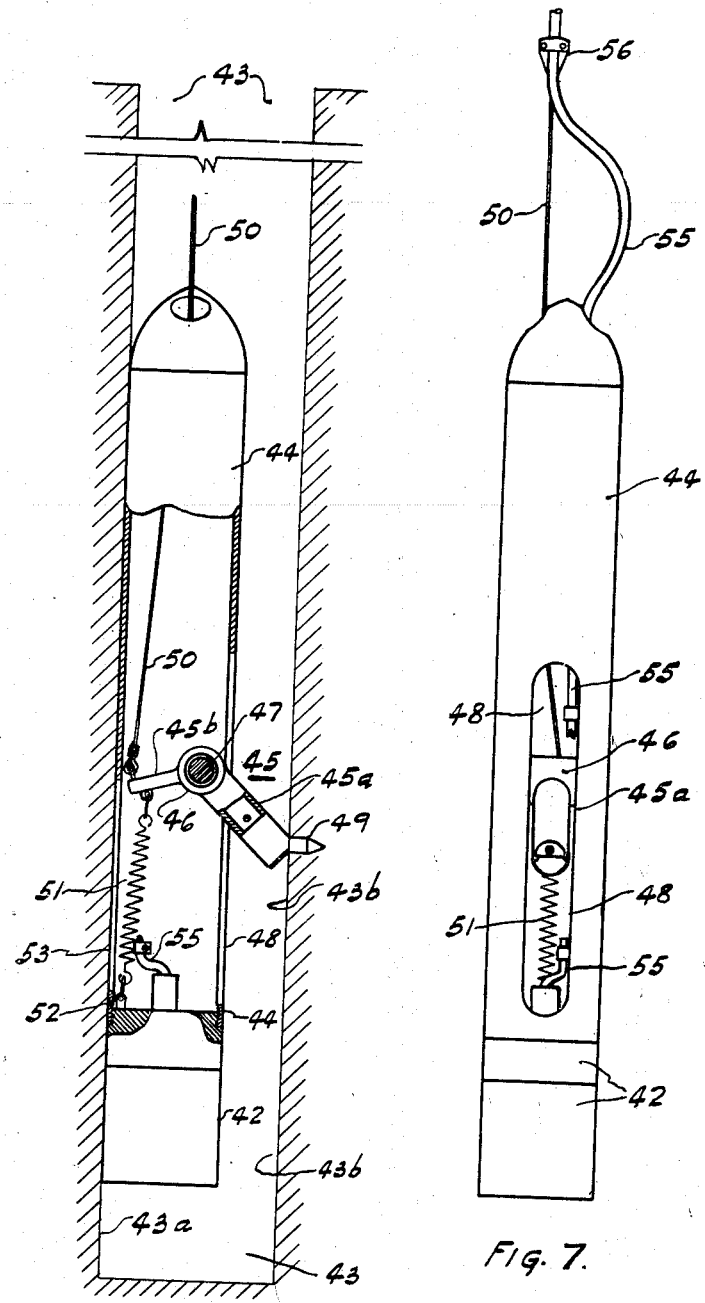

Fig. 6 is an elevation, partly in section, of a further preferred form of the invention illustrated in position within a drill hole; and Fig. 7 is a side view of the geophone and clamping mechanism of Fig. 6.

Referring to the drawing, the invention in one form is shown as applied to a seismic wave detector or geophone 10. The geophone has its seismic wave-detecting elements disposed within an outer casing, around which is secured a clamp 11, having upwardly extending arms 12, which come together above and centrally of the geophone. A bolt 13 extends through these arms and pivotally supports an actuating member 14. While the clamp 11 and arms 12 have been illustrated as separate from the casing of the geophone 10, it is obvious that the casing may be designed so as to incorporate these elements as a part thereof. The clamp 11 has an extension through which there extends a bolt 15, which serves pivotally to support a pair of clamping members or spikes 16 and 17.

Figure 1:
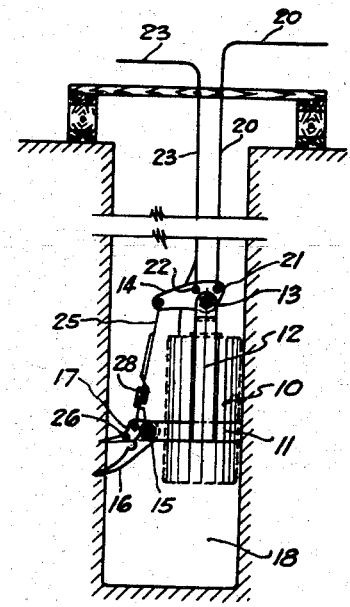
Fig. 1 illustrates the invention applied to a geophone which has been lowered and clamped into position within a drill hole.

In the holding position, as shown in Fig. 1, the shorter clamping member 17 has one end buried or imbedded in one side of a drill hole 18. The longer clamping member 16 has one end imbedded in the same side of the drill hole at a somewhat greater depth. The resultant effect is to force the geophone 10 against the opposite side of the drill hole 18 to insure good engagement therewith. By providing a firm engagement between the geophone and the side of the drill hole, the seismic wave-detecting mechanism will function satisfactorily to detect seismic waves by transforming them into electrical signals in sympathy therewith and of generally the same amplitude. The clamping action is due to the lever action. The actuating force includes the weight of the geophone 10, a component of which presses the clamping members toward one side of the drill hole and the geophone against the opposite side thereof.

The operating lever 14 is provided with means on opposite sides of the pivotal support 13 for actuating the lever in one direction or the other. Specifically, a rope 20 is tied or secured through an opening 21 of the operating lever and extends upwardly and out of the drill hole. Through another opening 22 on the opposite side of the pivot is secured the lead wire or cable 23, containing the lead wires which, it will be observed, extends into the geophone casing. This lead wire or cable 23 also extends out of the drill hole and serves to complete the electrical connections to the seismic wave-detecting mechanism located within the geophone 10.

If it is desired to lift the geophone from the drill hole 18, it is only necessary to grasp the rope 20 and give it a pull. This not only lifts the geophone 10, but, by reason of the pivotal mounting of the operating member 14, rotates this member in a counterclockwise direction and through an actuating link 25 rotates the clamping member 17 in a counterclockwise direction. By means of a projection 26 the clamping member 17 engages the other clamping member 16 and moves it in a counterclockwise direction. In this manner, as the geophone 10 moves upwardly, both clamping members 16 and 17 are moved out of the clamping position and finally occupy the position shown in Fig. 3. While the link 25 is pivoted at 25a to the shorter clamping member 17, it will be observed there is no direct connection to the other clamping member 16. This clamping member is biased toward its clamping position by means of a tension spring 28, at one end secured as at 28a to the link 25, and at the opposite end 28b secured to the longer link 16 at a point to the left of the pivot or bolt 15.

Figure 2:
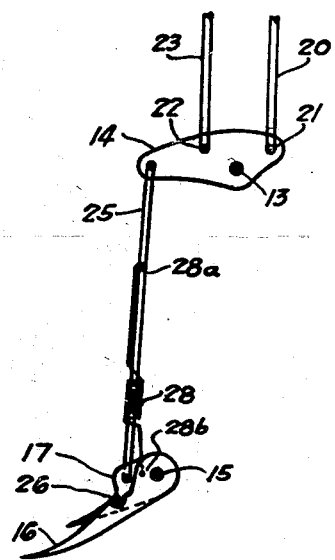
Fig. 2 is a side view of the clamping and operating mechanism with the clamping members in their fully extended positions.
Figures 3, 4, 5:
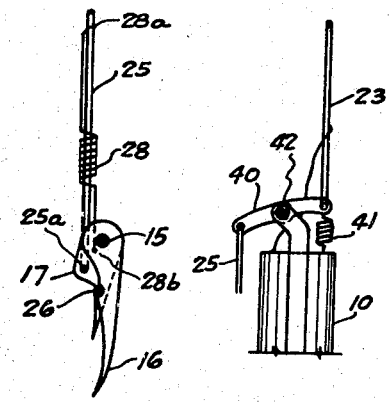
Fig. 3 is a plan view of the clamping members withdrawn to a substantial vertical position.
Fig. 4 is a side view of Fig. 3.
Fig. 5 illustrates a modified form of an operating mechanism.

With the parts in the position illustrated in Fig. 3, if it is desired again to clamp the geophone against the side of the drill hole the lead wire or cable 23 is firmly grasped and the rope 20 is released, thus transferring the weight of the geophone from the right-hand part of the operating lever 14 to the left-hand part thereof, as viewed in Figs. 1-4. This produces rotation of the operating member 14 in a clockwise direction, and through the link 25 rotates the shorter clamping member 17 in a clockwise direction. This rotation continues until the sharp or pointed member 17 engages the wall of the drill hole. At the same time the spring 28 rotates the longer clamping member 16 in a clockwise direction until its pointed end engages the side wall of the drill hole 18. Upon release of the cable or lead wire 23 the weight of the geophone 10 forces the clamping members into the side wall, while the reaction or thrust derived therefrom presses the geophone 10 against the opposite side of the drill hole. It will now be apparent that the geophone 10 may be located in any desired position within a drill hole, and securely clamped in that position.

By providing a plurality of geophones or clamping devices of the type described, a plurality of geophones may be located at predetermined distances along the length of the drill hole. It will be understood by those skilled in the art that drill holes may vary in diameter to some degree. Nevertheless, the clamping means is effective automatically to take care of such variations. If the diameter of the drill hole, at a particular spot, is so great that the shorter clamping member 17 does not engage the wall, it will be apparent that the spiked end of the longer clamping member 16 will engage the wall and serve effectively to clamp the geophone 10 in place.

While the form of the invention illustrated and described in connection with Figs. 1-4 is at present preferred, it will be apparent that many modifications of the invention may be made. For example, in Fig. 5 an operating lever 40 may be pivoted at the center with a tension spring 41 disposed to rotate the lever in a clockwise direction. Secured to the lever on the same side of the pivot as the spring is the electrical cable 23. The spring is selected so that the weight of the geophone is greater than the tension of the spring. The lever 40 is connected to the link 25 and the rest of the mechanism may be the same as illustrated in Figs. 1-4. Consequently, the weight of the geophone acting through the pivot 42 rotates the lever in a counterclockwise direction to move the clamping elements to their disengaged positions. After the geophone has been lowered to a suitable depth the lead wire is suddenly released. This removes the effect of the weight on the actuating lever and the spring thereupon rotates the lever in a clockwise direction, to move the clamping members into their clamping position and into engagement with the side of the drill hole. This modification of the invention has the advantage that the entire operation may be controlled through a single supporting element, whether it be a separate rope, cable, or the lead wires to the geophone.

In accordance with another preferred embodiment of the invention, Figs. 6 and 7, a geophone or seismic detector 42 is shown disposed within a drill hole 43. The geophone 42 has threaded to it a housing 44 which extends upwardly therefrom for the support of the clamping mechanism. This clamping mechanism comprises a clamping member in the form of a crank 45, the hub 46 of which is pivoted at 47. The pivot 47 is disposed within the housing 44 for movement of the arm 45a through an opening or window 48. This arm 45a, of the crank, carries a removable pin or spike 49, the sharpened end of which readily penetrates the side 43b of the drill hole. The other arm, 45b, of the crank, has secured thereto a rope or cable 50 as well as one end of a tension spring 51. The opposite end of the tension spring 51 may be secured to the housing 44, or as shown, to a bracket 52 extending upwardly from the closure member of the geophone 42. A window or opening 53, in the housing 44, is provided for access to the tension spring 51.

The tension spring 51 serves to bias the crank 45 for rotation in a counterclockwise direction. The tension spring 51 is so selected or adjusted that the bias applied to the arm 45b is overcome by the weight of the geophone or detector 42 and its associated housing 44 and the mechanism contained therein. Hence, by holding the upper end of the rope or cable 50, the weight of the geophone is applied to, and is sufficient to rotate, the crank 45 in a clockwise direction to withdraw the spike 49 and to move it and the arm 45a through the opening 48 of the housing 44. In the withdrawn position, the arm 45 and the spike 49 are disposed largely, if not entirely, within the housing 44 and hence, do not interfere with movement of the geophone up or down the drill hole 43.

The geophone or detector 42 may be firmly pressed against the side 43a of the drill hole at any selected position therein. Preferably the cable or rope 50 carries marks or identification means so that the length of the cable or rope, from the surface to the geophone, is known at all times. Hence, if it is desired to lower the geophone a distance of 20 feet, it is easy to do so by paying out the rope or cable 50 until the 20-foot mark appears at the upper end of the drill hole. Thereupon the cable 50 is suddenly released. The spring 51 is thereby made effective rapidly to rotate the crank 45 in a counterclockwise direction to drive the spike 49 into the side of the drill hole. Since the geophone is fairly heavy, it will be understood the spring 51 may be strong and hence, is effective to produce rapid movement of the arm 45. As soon as the spike 49 enters the side of the drill hole, the weight of the geophone and associated mechanism produces a thrust or component of force through the pivot pin 47. This thrust is transmitted through the pin 47 to the housing 44, and is effective to press the housing and geophone 42 firmly against the opposite side 43a of the drill hole. The angle of the arm 45a, with respect to the housing 44, produces a large clamping force which holds the housing 44 and geophone or detector 42 firmly against the side 43a of the drill hole 43.

The electrical connections to the geophone 42, may be taken out by way of conductors 55 which, as shown in Fig. 7, may be clamped, as at 56, to the rope or cable. A loop below the clamp 56 prevents application of the weight of the geophone on the electrical conductors 55.

In accordance with this form of the invention, the spike 49 may be provided with threads at one end threadedly to engage the end of the arm 45a. By unthreading the spike 49, a spike of greater or less length may be readily applied to the arm 45a to take care of drill holes of smaller or greater diameter. Further in accordance with the invention, it will be observed, the clamping mechanism is relatively positive in action. The spike 49 may be readily withdrawn from the side 43b of the drill hole by simply pulling on the rope or cable 50. The force or pull so applied not only lifts the housing 44 but insures, through the rotation of the arm 45a, the withdrawal of the spike. If the spike 49 should resist withdrawal, the housing 44 will move upwardly and across the drill hole until it bears against the side 43b. When so supported, the cable 50 then forms a positive actuating means for the arm 45 and the spike 49 will be forcibly withdrawn from the side 43b of drill hole 43.

In its withdrawn position, all outwardly extending parts are withdrawn or retracted into the housing 44 and there is thus eliminated any possibility of interference by contact with projections or irregularities in the side of the drill hole. On the other hand, the spring 51 is relatively strong, and of sufficient strength to cause rapid rotation of the arm 45a and the spike 49. This rapid rotation tends to drive the spike 49 into the side 43b of the drill hole and, hence, insures immediate and adequate penetration thereof into the side 43b for the support of the geophone 42 in a predetermined position. Additionally, the component of force extending horizontally of the drill hole is adequate, by reason of the multiplying action of the lever system, firmly to clamp the geophone 42 against the side 43a for the detection of seismic waves.

While preferred embodiments of the invention have been shown, it is to be understood the invention is not limited thereto since further modifications may be made without departing from the spirit and scope of the invention as set forth in the appended claims.

What is claimed is:

1. The combination of a detector of seismic waves mounted within a casing, a clamping member pivotally carried by said casing and movable into and out of a clamping position, an operating member pivotally connected to said casing, a spring interconnecting said operating member and said clamping member, and suspension means having its upper end supported near the mouth of said casing and its lower end connected to said operating member to move said clamping member out of said clamping position and also movable to produce movement of said clamping member by said spring to said clamping position.

2. The combination with a detector of seismic waves having a casing, of a pair of clamping members pivotally mounted for movement into and out of clamping position, an operating member pivotally mounted on said casing, suspension means having its upper end supported near the mouth of said casing and its lower end connected to an end of said operating member, an operating link extending between one of said clamping members and said operating member, a spring interconnecting said link and the other of said clamping members, and means carried by the first of said clamping members for moving the other of said clamping members out of said clamping position against the bias of said spring.

3. The combination, with a detector of seismic waves, of means for supporting the detector within a drill hole comprising an actuating member, means pivotally supporting said member from said detector, actuating means located on one side of said pivotal means for producing movement of said actuating member in one direction and including suspension means supported near the mouth of said drill hole, a clamping member pivotally carried by said detector, and means interconnecting said actuating member and said clamping member for movement of the latter into and out of a clamping position with movement of said actuating member in said one direction or in an opposite direction.

4. The combination with a detector of seismic waves, of a supporting and clamping means comprising an actuating member, means pivotally supporting said member from said detector, operating means located on one side of said pivotal means for producing movement of said actuating member in one direction, operating means located on the opposite side of said pivotal means for producing movement of said actuating member in the other direction, at least one of said operating means including suspension means supported near the mouth of a drill hole, a clamping member pivotally carried by said detector, means interconnecting said actuating member and said clamping member for movement of the latter into and out of a clamping position with movement of said actuating member in said one direction or said other direction, a second clamping member of materially greater length than said first member pivotally connected to said detector, a spring for moving said second clamping member in one direction, and means on said first clamping member for moving said second clamping member in the other direction.

5. The combination with a detector of seismic waves, of clamping means therefor comprising an actuating member, means for resiliently biasing said actuating member to a first position, means attached to said actuating member for supporting said detector, the weight of said detector producing movement of said actuating member to a second position against the bias of said resilient means, and clamping means movable into and out of a supporting position by movement of said actuating member between its first and second positions.

6. The combination with a detector of seismic waves, of at least one clamping member for clamping the detector against the wall of a drill hole, an operating member, means pivotally supporting said operating member from said detector, a link having one end connected to said operating member on one side of its pivotal supporting means and its other end connected to said clamping member, a spring connected to said operating member on the other side of its pivotal supporting means and to said detector for biasing said clamping member towards a clamping position, and suspension means having one end supported adjacent the mouth of the drill hole and the other end connected to said operating member on the same side of said pivotal supporting means as said spring for applying the weight of said detector to said operating member at its said pivotal supporting means thereby to move said clamping member against the bias of said spring out of its clamping position.

7. The combination with a detector of seismic waves, of means for supporting said detector within a drill hole comprising means supported near the mouth of the drill hole for lowering said detector in said hole, rotatable means connected to said detector and to said lowering means for operation by the weight of said detector to a first position, a spring for rotating said rotatable means to a second position upon removal of the weight of said detector from said lowering means, and means operable upon movement of said rotatable means towards its second position to engage one side of said drill hole to support said detector and to press it towards the opposite side of said drill hole.

8. Supporting means for a detector of seismic waves disposed within a drill hole comprising a crank arm, means carried by said detector for pivotally supporting said arm intermediate its ends, one arm of said crank terminating in a pointed end for movement into a supporting position, a spring connected to the opposite arm of said crank biasing said pointed arm to its said supporting position, and suspension means having its upper end supported adjacent the mouth of the drill hole and its lower end connected to said opposite arm for moving said pointed end out of its supporting position by the weight of said detector as applied to the said pivotal supporting means.

9. The combination with a detector of seismic waves adapted for use in a drill hole, of a housing carried by said detector, said housing having an opening along one side thereof, supporting means pivoted within said housing and movable through said opening into a supporting position, a spring biasing said supporting means to said supporting position, and suspension means having its upper end supported adjacent the mouth of said drill hole and its lower end operatively connected to said supporting means for applying the weight of said detector and of said housing to said supporting means to produce rotation thereof to a position within said housing and against the bias of said spring.

10. Means for supporting a detector of seismic waves within a hole in the earth's surface comprising an arm, pivot means carried by said detector for pivotally supporting said arm with at least one end thereof spaced from said pivot means, suspension means having its upper end supported near the mouth of said hole and its opposite end connected to said one end of said arm for developing by the weight of said detector torque upon said arm, a spike movable by said arm from a retracted position to an extended position for engagement with one side wall of the hole thereby to press said detector against the opposite side thereof, said torque being effective to move said spike to one of its said positions, and means operable upon release of said upper end of said suspension means and after a resultant reduction in said torque for moving said spike towards the other of its said positions.

11. The combination with a detector of seismic waves, of means for supporting said detector within a drill hole comprising suspension means for lowering said detector in and lifting it from said hole, means pivoted to said detector and rotatable out of and into engagement with one side of said hole to press said detector against the other side thereof, means connected to said suspension means for operating said pivoted means in one direction by the weight of said detector and a spring for operating said pivoted means in the opposite direction.

GEORGE B. LOPER.

REFERENCES CITED

The following references are of record in the file of this patent:

UNITED STATES PATENTS

| Number | Name | Date |
| --- | --- | --- |
| 2,327,023 | Danner | Aug. 17, 1943 |
| 2,173,532 | De Long | Set. 19, 1939 |
| 2,252,620 | De Long | Aug. 12, 1941 |
| 1,895,643 | Putnam | Jan. 31, 1933 |
| 1,258,834 | Waitz | Mar. 12, 1918 |
| 2,344,598 | Church | Mar. 21, 1944 |
| 2,087,702 | Peters | July 20, 1937 |